Sept. 25, 1928.
A. Y. DODGE
1,685,523
TRANSMISSION
Filed June 7, 1926
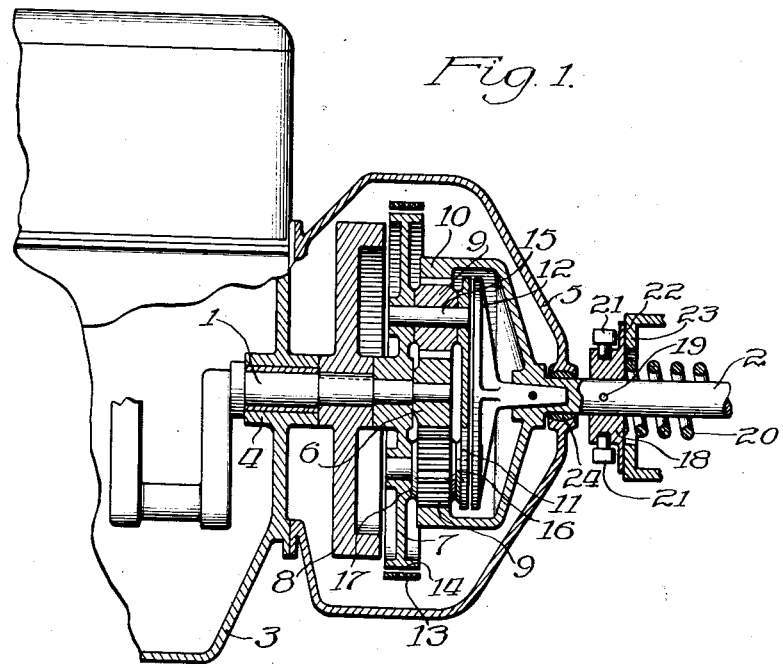
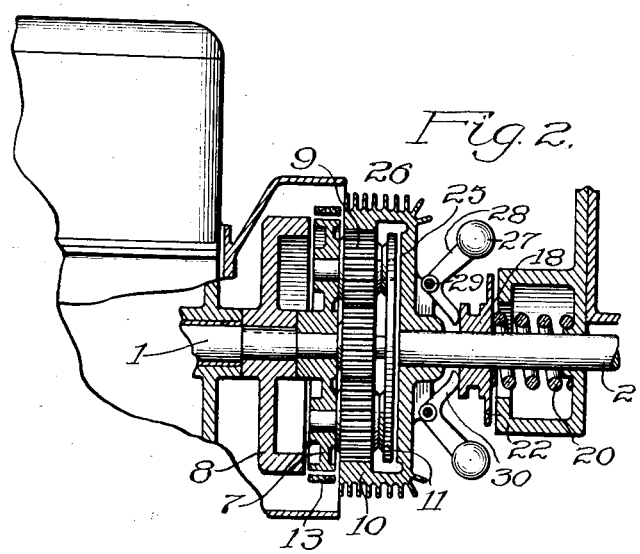
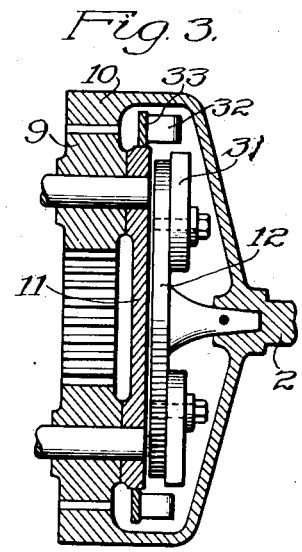
Inventor:
A. Y. Dodge Patented Sept. 25, 1928.

1,685,523

UNITED STATES PATENT OFFICE.

ADIEL Y. DODGE, OF SOUTH BEND, INDIANA.

TRANSMISSION.

Application filed June 7, 1926. Serial No. 114,081.

My invention relates to variable speed transmissions.

One of the objects of my invention is to provide an improved variable speed transmission in which the speed may be changed without the shifting of gears.

A further object is to provide an improved variable speed transmission which does not require the use of a special reversed gear in order to reverse the rotation of the driven member.

Further objects will appear from the description and claims.

In the drawings, in which several embodiments of my invention are shown,

Figure 1 is a vertical axial view showing the transmission associated with the crank shaft and propeller shaft;

Fig. 2 is a vertical axial section showing speed controlled means for assisting in the control; and Fig. 3 is a vertical axial section showing the use of a magnetic clutch or speed controller.

Referring to the drawings in detail, and first to Fig. 1, the construction shown therein comprises a driving member 1, which may be the crank shaft of the motor of an automobile, a driven member 2 coaxial with the driving member, which may be the propeller shaft of the automobile, and transmission means between the crank shaft and propeller shaft whereby practically any forward speed of the propeller shaft may be secured up to the speed of the crank shaft, and whereby when desired a reverse movement of the propeller shaft with respect to the crank shaft may be secured.

The crank shaft is shown in a crank case 3 and provided with a chank shaft bearing 4. The transmission may be in a suitable housing 5 secured to the crank case. The transmission comprises a driving pinion 6 secured to rotate with the crank shaft, a spider or gear carrier 7 rotatably mounted on the crank shaft adjacent the fly-wheel 8, a set of planetary gears 9 mounted on the gear carrier 7 and meshing with the pinion, an internal gear 10 mounted on the propeller shaft 2, and meshing with the planetary gears, a friction disk 11 mounted to revolve with the gear carrier 7, a friction disk 12 mounted to revolve with the internal gear and propeller shaft, and movable into and out of frictional engagement with the first friction disk 11 for variably controlling the speed of the propeller shaft, and when desired bringing it up to the speed of the crank shaft, and a band brake 13 cooperating with a brake surface 14 on the gear carrier 7 to effect reverse movement of the propeller shaft with respect to the crank shaft when desired.

The friction disk 11 is secured to the gear carrier 7 by means of the pins 15 on which the planetary gears 9 are mounted. The planetary gears, friction disk 11 and gear carrier 7 are so related to the pins 15 on which the planetary gears are mounted that when the friction disk 12 is pressed against the friction disk 11 the bosses 16 on friction disk 11 will be pressed against the hubs of the planetary gears 9, and the hubs of the planetary gears will be pressed against the bosses 17 on the gear carrier. The purpose of this is to utilize the surfaces of the planetary gears which engage the bosses on the disk and gear carrier as friction surfaces to assist the friction surfaces of the disks in their speed controlling or clutch action. The friction disk 12 is controlled in its movement with respect to the friction disk 11 by means of a grooved collar 18 secured to the propeller shaft 2 by means of a pin 19. When the collar 18 is moved to the left as seen in Fig. 1, the propeller shaft 2, ring gear 10 and friction disk 12 also are moved to the left until the friction disk 12 engages the friction disk 11. A coil compression spring 20 surrounding the propeller shaft presses against the grooved collar 18 and tends to bring the friction disk 12 into engagement with the friction disk 11. A shifter yoke 21 having pins engaging the groove in the collar 18 may be connected with a control pedal by means of which the collar 18 may be shifted to hold the friction disk 12 away from the friction disk 11.

In order to retard or stop the rotation of the propeller shaft when the friction disks 11 and 12 are out of engagement with each other, the collar 18 is provided with a brake flange 22 which engages a stationary brake flange 23 on the housing for the spring. The propeller shaft may be rotatably mounted in a self aligning bearing 24 mounted in the transmission case 5. The lateral shifting of the ring gear 10 in its speed controlling or clutching action is so slight as not to interfere with its effectiveness as a transmission.

In operation, if the automobile is standing still and the propeller shaft 2 is stationary and the engine is running, and it is desired to put the car in motion, the pedal controlling the shifter collar 18 is released and the compression spring 20 is allowed to press the friction disk 12 into engagement with the friction disk 11. So long as the propeller shaft 2 is stationary and the crank shaft 1 is revolving, the gear carrier 7 also will be revolving but at a speed very much less than the speed of a crank shaft, in accordance with the well known laws governing planetary gear transmission.

When, as outlined above, the friction disk 12 is allowed to be pressed into engagement with the disk 11, the propeller shaft 2 will begin to rotate, slowly at first, and this rotation of the propeller shaft will gradually increase in speed until the propeller shaft is rotating at the same speed as the gear carrier 7, and the gear carrier is rotating at the same speed as the crank shaft. It is to be noted that the friction between the hubs of the planetary gears and the bosses 16 and 17 on the friction disk and gear carrier acts to assist the gear carrier in picking up speed, as relative rotation between the gear carrier and crank shaft is opposed by this friction and consequently the tendency of this friction is to prevent relative rotation between the crank shaft and gear carrier. The accelerating action is that the gear carrier is gradually brought up to the same speed as the crank shaft and the propeller shaft is at the same time gradually brought up to the speed of the gear carrier. At the very lowest speed this is not an efficient transmission, but at all practical speeds the transmission is sufficiently efficient, being substantially the ratio between the speed of the propeller shaft and the speed of the gear carrier.

To effect a reverse movement of the propeller shaft with respect to the crank shaft, the friction disks 11 and 12 are held out of engagement and the band brake 13 is applied to hold the gear carrier against rotation. This results in a reverse movement of the propeller shaft 2 with respect to the crank shaft 1 in accordance with the well known laws of planetary gearing, the reverse movement of the propeller shaft, however, being at a considerably lower speed than the forward speed of the crank shaft, the ratio being that of the pitch diameter of the pinion to the pitch diameter of the ring gear.

The construction shown in Fig. 2 is substantially the same as that just described, except that in this construction speed controlled means are supplied for assisting in the control, and the friction surface 25 which cooperates with the friction disk 11 carried by the gear carrier 7 is formed on the ring gear 10 itself. If desired, the ring gear may be provided with heat radiating fins 26 to dissipate the heat generated by the friction surfaces.

The speed controlled means comprise a fly-ball governor construction, the balls 27 being mounted on arms 28 pivoted at 29 to the ring gear 10 and having fingers 30 which bear against the collar 18. Under certain conditions this fly-ball governor construction will automatically control the slippage between the friction disk 11 and the friction surface 25, thus automatically controlling the speed ratio between the crank shaft 1 and the propeller shaft 2. Thus, in going up hill, the crank shaft speed will decrease and the propeller shaft will decrease also and this will lessen the pressure which the fingers 30 exert against the collar 18, and consequently lessen the pressure of the friction surface 25 against the friction disk 11. This decrease of the pressure lessens the friction between the surface 25 and the disk 11 and permits slippage between the disk 11 and the surface 25, the slippage increasing as the propeller shaft speed decreases. This permits the engine to run at a speed which may be considerably greater than the propeller shaft speed, thus automatically putting the transmission in lower gear.

In Fig. 3 is shown a construction which is substantially the same as that shown in Fig. 1, except that in addition to the friction between disks 11 and 12 a magnetic drag is provided which tends to prevent relative rotation between the disk 11 and the disk 12. The construction is so that the magnetic drag increases as the disk 12 is brought over toward the disk 11. This magnetic drag construction comprises a plurality of permanent horse-shoe magnets 31 secured to rotate with the friction disk 12 and a plurality of loop conductors 32 which may be secured on a mounting ring 33 fastened to the outer edge of the friction disk 11. When slippage takes place between the disks 11 and 12 the lines of magnetic force are cut by the conductors, resulting in a magnetic drag as is well understood in connection with such constructions. When the disk 12 is moved back out of engagement, the lines of force are not cut by the loops 32, so that no magnetic drag results.

While I have described several embodiments of my invention, it is obvious that many other modifications therein may occur to those skilled in the art, and I desire, therefore, that my invention be limited only by the scope of the appended claims and by the prior art.

I claim:

1. A variable speed transmission comprising a rotatable driving member, a rotatable driven member coaxial therewith, a gear secured to rotate with the driving member and coaxial therewith, a gear secured to rotate with the driven member and coaxial therewith, a gear carrier coaxial with said gears, a gear mounted on said gear carrier and meshing with both said coaxial gears and means for variably controlling the relative rotation of said gear carrier with respect to said driven gear comprising a drag member secured to rotate with said gear carrier, and a second drag member cooperating with said first drag member and rotatable with said driven member, the gear which is rotatable with the driven member being an internal gear and having a chamber in which said drag members are located.

2. A variable speed transmission comprising a rotatable driving member, a rotatable driven member coaxial therewith, a gear secured to rotate with the driving member and coaxial therewith, a gear secured to rotate with the driven member and coaxial therewith, a gear carrier coaxial with said gears, a gear mounted on said gear carrier and meshing with both said coaxial gears and means for variably controlling the relative rotation of said gear carrier with respect to said driven gear comprising a friction disk coaxial with said gear carrier and gears, and mounted to rotate with said gear carrier, and a second friction disk engageable with said first friction disk and coaxial therewith and mounted to rotate with said rotatable driven member.

3. A variable speed transmission comprising a rotatable driving member, a rotatable driven member coaxial therewith, a gear secured to rotate with the driving member and coaxial therewith, a gear secured to rotate with the driven member and coaxial therewith, a gear carrier coaxial with said gears, a gear mounted on said gear carrier and meshing with both said coaxial gears and means for variably controlling the relative rotation of said gear carrier with respect to said driven gear comprising a friction disk coaxial with said gear carrier and gears, and mounted to rotate with said gear carrier, and a second friction disk engageable with said first friction disk and coaxial therewith and mounted to rotate with said rotatable driven member, the gear which is rotatable with the driven member being an internal gear and having a chamber in which said friction disks are mounted.

4. A variable speed transmission comprising a rotatable driving member, a rotatable driven member coaxial therewith, a gear secured to rotate with the driving member and coaxial therewith, a gear secured to rotate with the driven member and coaxial therewith, a gear carrier coaxial with said gears, a friction disk coaxial with said gear carrier and spaced therefrom, and rotatable therewith, a pin extending between and secured to said gear carrier and friction disk, a gear mounted on said pin and meshing with both said coaxial gears, a friction disk coaxial with said driven member and rotatable therewith and engageable with said first friction disk.

5. A variable speed transmission comprising a rotatable driving member, a rotatable driven member coaxial therewith, a gear secured to rotate with the driving member and coaxial therewith, a gear secured to rotate with the driven member and coaxial therewith, a gear carrier coaxial with said gears, a friction disk coaxial with said gear carrier and spaced therefrom, and rotatable therewith, a pin extending between and secured to said gear carrier and friction disk, a gear mounted on said pin and meshing with both said coaxial gears, a friction disk coaxial with said driven member and rotatable therewith and engageable with said first friction disk, the gear which is rotatable with the driven member being an internal gear and having a chamber in which said friction disks are located.

6. A variable speed transmission comprising a rotatable driving member, a rotatable driven member coaxial therewith, a gear secured to rotate with the driving member and coaxial therewith, a gear secured to rotate with the driven member and coaxial therewith, a gear carrier coaxial with said gears, a gear mounted on said gear carrier and meshing with both said coaxial gears, and means for variably controlling the relative rotation of said gear carrier with respect to said gear comprising a friction member assembled to rotate with said gear, a second friction member engageable with said first friction member and rotatable with said driven member, and means for shifting said driven member axially to vary the friction between said friction members.

In witness whereof, I have hereunto subscribed my name.

A. Y. DODGE.